(12) United States Patent
Workley

(10) Patent No.: US 9,010,644 B1
(45) Date of Patent: Apr. 21, 2015

(54) DYNAMIC MAGNETIC STRIPE COMMUNICATIONS DEVICE WITH STEPPED MAGNETIC MATERIAL FOR MAGNETIC CARDS AND DEVICES

(71) Applicant: Dynamics Inc., Cheswick, PA (US)

(72) Inventor: James H. Workley, Imperial, PA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 14/071,565

(22) Filed: Nov. 4, 2013

Related U.S. Application Data

(60) Provisional application No. 61/732,080, filed on Nov. 30, 2012.

(51) Int. Cl.
*G06K 19/02* (2006.01)
*G06K 19/06* (2006.01)

(52) U.S. Cl.
CPC .......... *G06K 19/06206* (2013.01); *G06K 19/02* (2013.01)

(58) Field of Classification Search
CPC ......... G06K 21/00; G06K 19/06; G06K 7/08; G06K 5/00; G06K 19/02; G06K 19/07779; G06K 19/07783; G06K 19/07722; G06K 19/077
USPC .......... 235/488, 380, 492, 451, 487, 493, 449
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Edwyn Labaze

(57) ABSTRACT

A flexible card may include a dynamic magnetic stripe communications device having multiple layers, such as an electromagnetic generator, a magnet, and a shield. A shield may form a non-flexible layer within the stack and may bend, but the shield may not be able to stretch or compress. Flexible layers may surround and adhere to the shield such that when the card is flexed, the flexible layers may stretch and compress with the movement of the shield. The dynamic magnetic stripe communications device may include one or more coils. Each coil may contain a stepped material, such that a length of a lower layer of the stepped material is longer than a length of a middle layer of the stepped material which is longer than a length of a top layer of the stepped material.

18 Claims, 7 Drawing Sheets

(56) References Cited

U.S. PATENT DOCUMENTS

| | | |
|---|---|---|
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman et al. |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |

(56) References Cited

U.S. PATENT DOCUMENTS

| | | |
|---|---|---|
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0145971 A1 | 6/2009 | Yin |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

DYNAMIC MAGNETIC STRIPE COMMUNICATIONS DEVICE WITH STEPPED MAGNETIC MATERIAL FOR MAGNETIC CARDS AND DEVICES

CROSS-REFERENCE TO RELATED APPLICATION

This application claims the benefit of U.S. Provisional Patent Application No. 61/732,080, titled "DYNAMIC MAGNETIC STRIPE COMMUNICATIONS DEVICE WITH STEPPED MAGNETIC MATERIAL FOR MAGNETIC CARDS AND DEVICES," filed Nov. 30, 2012, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic stripe communications device. Such a dynamic magnetic stripe communications device may take the form of a magnetic encoder or an electromagnetic generator. A magnetic encoder may change the information located on a magnetic medium such that a magnetic stripe reader may read changed magnetic information from the magnetic medium. An electromagnetic generator may generate electromagnetic fields that directly communicate data to a magnetic stripe reader. Such an electromagnetic generator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. A barcode, for example, may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, and a dynamic magnetic stripe communications device). A processor may be coupled to surface contacts such that the processor may perform the processing capabilities of, for example, an EMV chip. The processor may be laminated over and not exposed such that a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a payment option. The code may be received by the card via manual input (e.g., onto buttons of the card).

An electromagnetic generator may be constructed as a stacked assembly of layers where one of the layers includes one or more coils. Inside each coil, one or more strips of a material (e.g., a magnetic or non-magnetic material) may be provided. Outside of the coil, one or more strips of a material (e.g., a magnetic or non-magnetic material) may be provided. For example, three strips of soft magnetic material may be provided in a coil and one strip of hard magnetic material may be stacked exterior of the coil on the side of the coil opposite of the side of the coil utilized to serially communicate magnetic stripe data to a magnetic stripe reader.

An electromagnetic generator may include a coil that may produce an electromagnetic field when current is conducted through the coil. A magnetic material (e.g., a soft-magnetic material) may be located within the coil, which may enhance the electromagnetic field produced by the coil. For example, multiple or several strips of soft-magnetic material may be stacked to form a stepped material inside of the coil.

The one or more strips of material (e.g., a soft-magnetic material) within the coil may be of different lengths. Accordingly, for example, a length of a first strip of material may be longer than a length of a second strip of material, a length of the second strip of material may be longer than a third strip of material, and so on, to form multiple strips of material having a stepped structure within the coil.

A magnetic material (e.g., a hard-magnetic material) may be stacked outside of the coil. The hard-magnetic material may be provided on the side of the coil opposite the side of a coil that communicates to a read head of a magnetic stripe reader. The electromagnetic field produced by the coil may be subjected to a torque that may be induced by the magnetic field generated by the hard-magnetic material stacked outside of the coil.

A shield may be stacked adjacent to the electromagnetic generator. For example, a shield may be provided adjacent to the electromagnetic generator on a side opposite a side that communicates data to a read-head of a magnetic stripe reader. In so doing, the shield may reduce a magnetic bias from a magnetic material located outside of a coil of an electromagnetic generator, as well as reduce an electromagnetic field that may be produced by a coil of an electromagnetic generator. In doing so, magnetic-based signals from an electromagnetic generator may be substantially attenuated on an adjacent side of the electromagnetic generator.

The shield may, for example, be an assembly of multiple strips of shielding material that may be bonded together using a flexible adhesive, such as a room-temperature vulcanizing compound (e.g., an RTV silicone). The adhesive may, for example, be cured by exposure to a change in one or more conditions (e.g., a change in atmospheric humidity). Once cured, the flexible adhesive may bond the strips of shielding material together while at the same time remaining flexible. The shield assembly may, for example, be bonded to a magnetic material using an adhesive, such as a pressure-sensitive adhesive, that remains flexible. An additional layer of flexible adhesive may be bonded to the shield assembly. Accordingly, for example, the shield assembly may float between two layers of flexible adhesive to allow the shield assembly to bend and flex while the flexible adhesive stretches and compresses in conformance with movement of the shield assembly.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
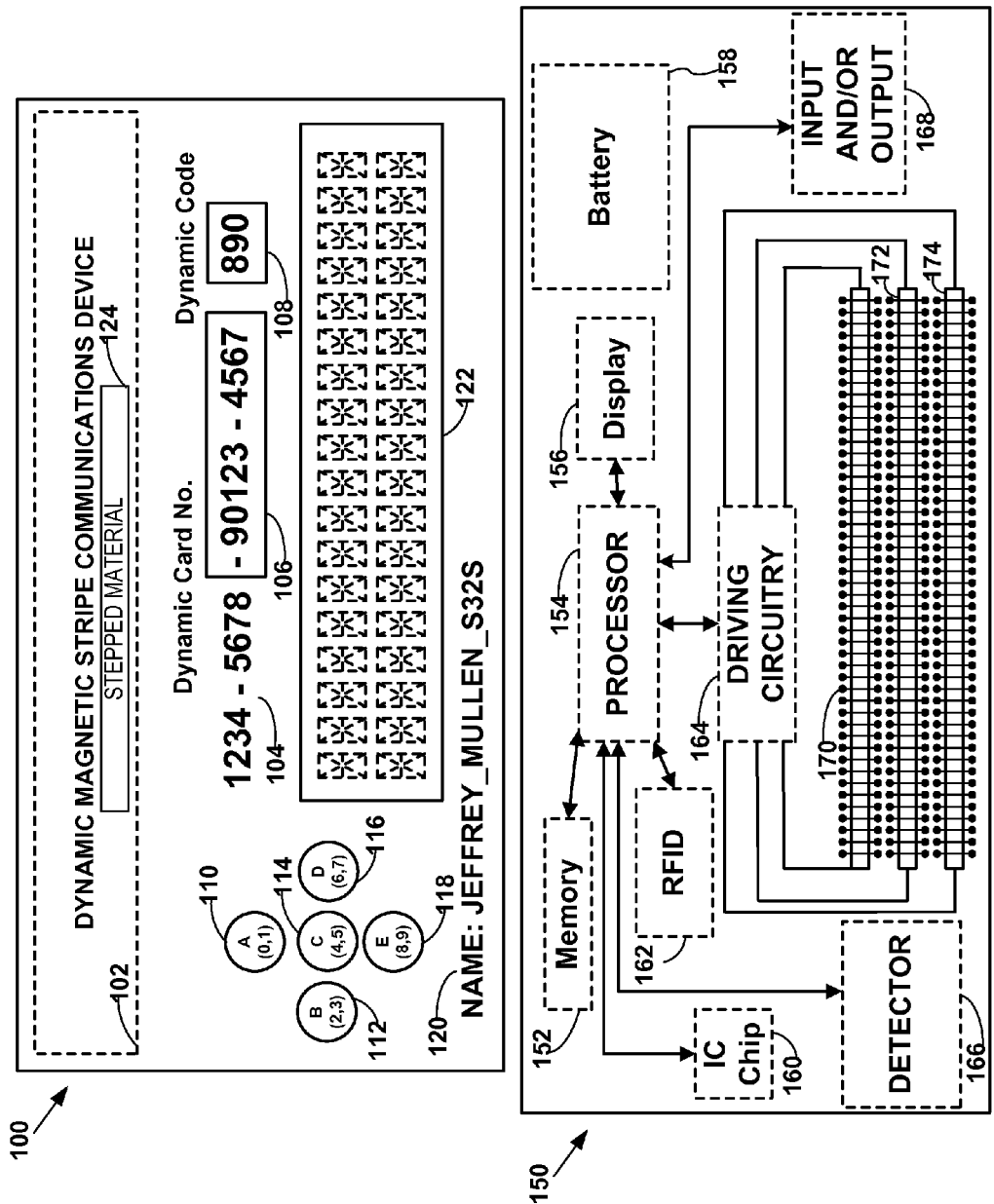
FIG. 1 is an illustration of a card and architecture constructed in accordance with the principles of the present invention.

FIG. 1 shows card 100 that may include, for example, a dynamic number that may be entirely, or partially, displayed using a display (e.g., display 106). A dynamic number may include a permanent portion such as, for example, permanent portion 104 and a dynamic portion such as, for example, dynamic portion 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may also be entirely, or partially, displayed via a second display (e.g., display 108). Display 108 may be utilized, for example, to display a dynamic code such as a dynamic security code. Card 100 may also include third display 122 that may be used to display graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electrochromic, may be provided as well.

Other permanent information, such as permanent information 120, may be included within card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as buttons 110-118. Buttons 110-118 may be included to accept data entry through mechanical distortion, contact, or proximity. Buttons 110-118 may be responsive to, for example, induced changes and/or deviations in light intensity, pressure magnitude, or electric and/or magnetic field strength. Such information exchange may be determined and processed by a processor of card 100 as data input.

Dynamic magnetic stripe communications device 102 may be included on card 100 to communicate information to, for example, a read-head of a magnetic stripe reader via, for example, electromagnetic signals. Dynamic magnetic stripe communications device 102 may be formed on a printed circuit board (PCB) as a stacked structure including, for example, an electromagnetic generator including an interior stepped material (e.g., stepped soft-magnetic material 124), an exterior magnet, and a shield. The electromagnetic generator, exterior magnet and shield may be stacked and adhered together using any combination of flexible adhesion components to form dynamic magnetic stripe communications device 102 having elastic and flexible characteristics.

Accordingly, for example, dynamic magnetic stripe communications device 102 may exhibit a flexibility whereby each layer of the stack may move independently of each other layer, while at the same time maintaining adhesion between all layers of the stack. In so doing, individual components of each layer of dynamic magnetic stripe communications device 102 may maintain a correct orientation to each other layer while card 100 may undergo bending and flexing.

A material (e.g., stepped soft-magnetic material 124) and an exterior magnet (not shown) may, for example, interact to improve performance of dynamic magnetic stripe communications device 102 while dynamic magnetic stripe communications device 102 generates an electromagnetic signal. For example, stepped ends of soft-magnetic material 124 may cause a gradual change (e.g., a gradual increase in the magnetic field magnitude) as a function of a position of a read head of a magnetic stripe reader along dynamic magnetic stripe communications device 102 (e.g., along end portions of dynamic magnetic stripe communications device 102).

Card 100 may, for example, be formed as a laminate structure of two or more layers. Card 100 may, for example, include top and bottom layers of a plastic material (e.g., a polymer). Electronics package circuitry (e.g., one or more printed circuit boards, a dynamic magnetic stripe communications device, a battery, a display, a processor, and buttons) may be sandwiched between top and bottom layers of a laminate structure of card 100. A material (e.g., a polyurethane-based or silicon-based substance) may be applied between top and bottom layers and cured (e.g., solidified) to form card 100 that has a flexible laminate structure.

FIG. 1 shows architecture 150, which may include, for example, one or more processors 154. One or more processors 154 may be configured to utilize external memory 152, internal memory within processor 154, or a combination of external memory 152 and internal memory for dynamically storing information, such as executable machine language, related dynamic machine data, and user input data values.

One or more of the components shown in architecture 150 may be configured to transmit information to processor 154 and/or may be configured to receive information as transmitted by processor 154. For example, one or more displays 156 may be coupled to receive data from processor 154. The data received from processor 154 may include, for example, at least a portion of dynamic numbers and/or dynamic codes. The data to be displayed on the display may be displayed on one or more displays 156.

One or more displays 156 may, for example, be touch sensitive and/or proximity sensitive. For example, objects such as fingers, pointing devices, etc., may be brought into contact with displays 156, or in proximity to displays 156. Detection of object proximity or object contact with displays 156 may be effective to perform any type of function (e.g., transmit data to processor 154). Displays 156 may have multiple locations that are able to be determined as being touched, or determined as being in proximity to an object.

Input and/or output devices may be implemented within architecture 150. For example, integrated circuit (IC) chip 160 (e.g., an EMV chip) may be included within architecture 150, that can communicate information with a chip reader (e.g., an EMV chip reader). Radio frequency identification (RFID) module 162 may be included within architecture 150 to enable the exchange of information with an RFID reader.

Other input and/or output devices 168 may be included within architecture 150, for example, to provide any number of input and/or output capabilities. For example, other input and/or output devices 168 may include an audio device capable of receiving and/or transmitting audible information. Other input and/or output devices 168 may include a device that exchanges analog and/or digital data using a visible data carrier. Other input and/or output devices 168 may include a device, for example, that is sensitive to a non-visible data carrier, such as an infrared data carrier or electromagnetic data carrier.

Electromagnetic field generators 170-174 may communicate one or more tracks of electromagnetic data to read-heads of a magnetic stripe reader. Electromagnetic field generators 170-174 may include, for example, a series of electromagnetic elements, where each electromagnetic element may be implemented as a coil wrapped around one or more materials (e.g., a soft-magnetic material and/or a non-magnetic material). Additional materials, such as a magnet (not shown) and a shield (not shown), may be stacked in proximity to electromagnetic field generators 170-174 using any combination of adhesives (e.g., flexible adhesives), so that the stacked components may be flexed while remaining within a substantially fixed relationship to one another.

Electrical excitation by processor 154 of one or more coils of one or more electromagnetic elements via, for example, driving circuitry 164 may be effective to generate electromagnetic fields from one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented on architecture 150 may be determined by processor 154. One or more detectors 166 may be utilized, for example, to sense the proximity, mechanical distortion, or actual contact, of an external device, which in turn, may trigger the initiation of a communication sequence. The sensed presence or touch of the external device may then be communicated to a controller (e.g., processor 154), which in turn may direct the exchange of information between architecture 150 and the external device. The sensed presence, mechanical distortion, or touch of the external device may be effective to, for example, determine the type of device or object detected.

The detection may include, for example, the detection of a read-head housing of a magnetic stripe reader. In response, processor 154 may activate one or more electromagnetic field generators 170-174 to initiate a communications sequence with, for example, one or more read-heads of a magnetic stripe reader. The timing relationships associated with communications to one or more electromagnetic field generators 170-174 and one or more read-heads of a magnetic stripe reader may be provided through use of the detection of the magnetic stripe reader.

Persons skilled in the art will appreciate that processor 154 may provide user-specific and/or card-specific information through utilization of any one or more of buttons 110-118, RFID 162, IC chip 160, electromagnetic field generators 170-174, and other input and/or output devices 168.

Persons skilled in the art will appreciate that a card (e.g., card 100 of FIG. 1) may, for example, be a self-contained device that derives its own operational power from one or more batteries 158. Furthermore, one or more batteries 158 may be included, for example, to provide operational power to a card for a number of years (e.g., approximately 2-4 years). One or more batteries 158 may be included, for example, as rechargeable batteries.

Figure 2:
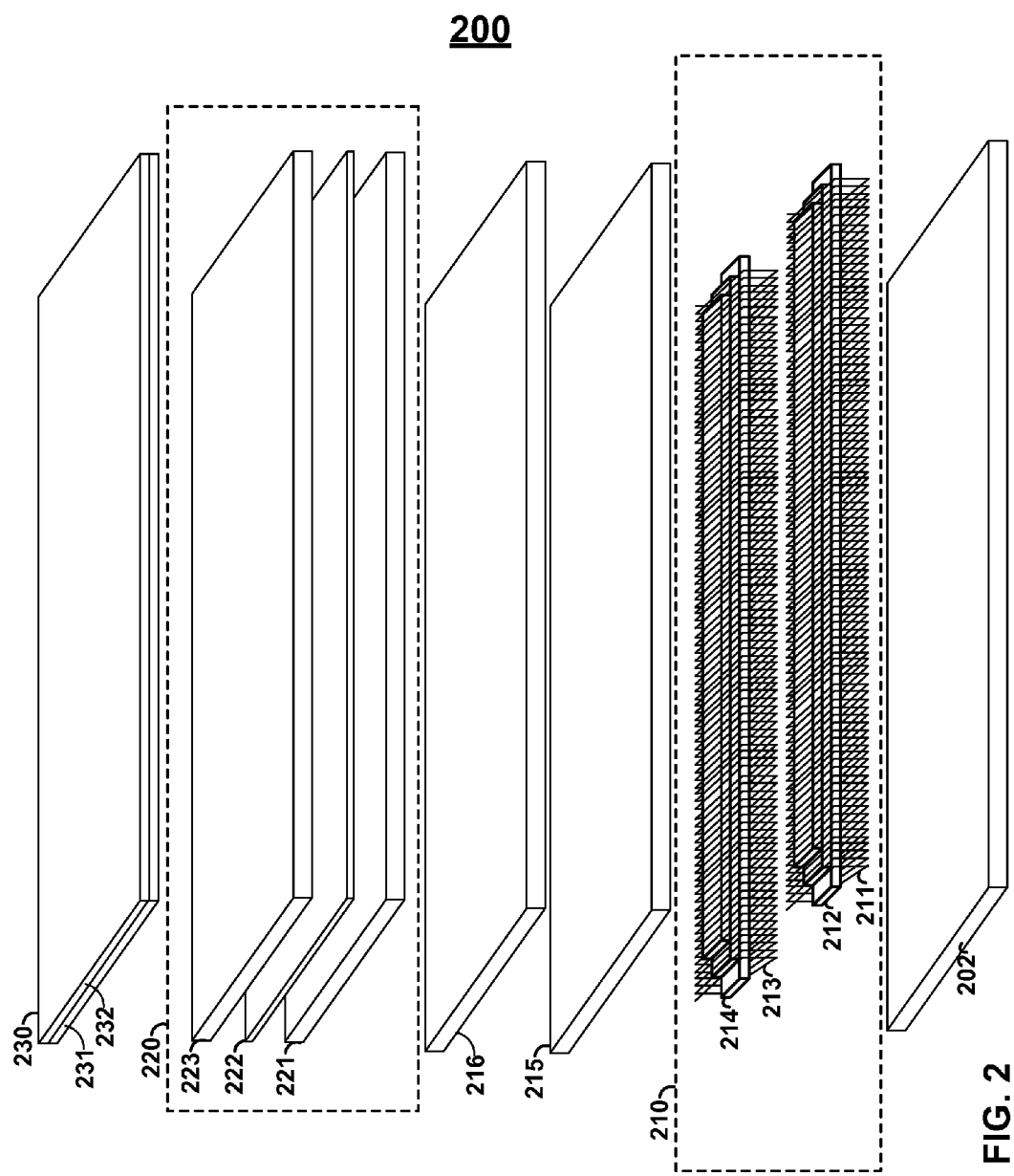
FIG. 2 is an illustration of a dynamic magnetic stripe communications device constructed in accordance with the principles of the present invention.

FIG. 2 shows dynamic magnetic stripe communications device 200 that may include printed circuit board (PCB) 202 and an adhesive layer (not shown) on top of PCB 202, electromagnetic generator 210 and another adhesive layer (not shown) on top of electromagnetic generator 210, magnet 215, adhesive layer 216, shield 220, and protective layer 230. Electromagnetic generator 210 may include, for example, one or more coils (e.g., two coils 211 and 213) that may each include a conductive winding (e.g., a copper winding) that may surround material (e.g., stepped soft-magnetic material 214 and 212, respectively) along at least a portion of respective lengths of materials 212 and 214. Two tracks of electromagnetic data may, for example, be communicated by electromagnetic generator 210 to read-heads of a magnetic stripe reader by appropriate control of current conducted by coils 211 and 213. Materials 212 and 214 may, for example, include one or more (e.g., three) layers of material (e.g., soft-magnetic material) each having a different length to provide a stepped shape on one or both ends of materials 212 and 214.

Electromagnetic generator 210 may, for example, be constructed as a multiple-layer circuit (e.g., a circuit constructed on a multiple-layer printed circuit board (PCB)). A first layer, for example, may include patterns of a conductive element (e.g., copper) that may be added to a PCB substrate according to a patterning mask definition layer to form portions (e.g., the bottom portions) of coils 211 and 213. Alternately, a first layer of a PCB may, for example, include patterns of a conductive element (e.g., copper) that may be subtracted from a pre-plated PCB substrate according to an etching mask definition layer to form portions (e.g., the bottom portions) of coils 211 and 213. A second PCB layer may, for example, use additive and/or subtractive techniques to form portions (e.g., the top portions) of coils 211 and 213.

The first and second PCB layers may be separated by an insulation layer (e.g., a dielectric layer). Pockets within the insulation layer (e.g., pockets located between the top and bottom portions of coils 211 and 213) may include a magnetic material (e.g., a lamination stepped layers of soft magnetic material) to form materials 212 and 214.

The top and bottom portions of coils 211 and 213 may be interconnected through the insulation layer (e.g., interconnected using plated vias through the insulation layer) to form coils 211 and 213. Conductive pads (not shown) may be patterned at each end of coils 211 and 213 on the first and/or second layers of the PCB, so that electrical signals (e.g., current) may be conducted through coils 211 and 213.

Magnet 215 may be arranged in proximity to coils 211 and 213, such that magnet 215 may extend along at least a portion of a length of coils 211 and 213. Magnet 215 may be arranged in proximity to coils 211 and 213, such that magnet 215 may extend along at least a portion of a width of coils 211 and 213.

Layer 216 may include a flexible adhesive, such as a pressure-sensitive adhesive (e.g., a solvent-based acrylic). Layer 216 may include a liner (not shown) that may remain in place to allow compression of layer 216 onto magnet 215. Accordingly, for example, adhesion between layer 216 and layer 215 may be activated by a die of a press (not shown) while the liner (not shown) of layer 216 prevents adhesion of layer 216 to the die.

Shield 220 may include, for example, two shields (e.g., shields 221 and 223) that may be bonded together (e.g., via layer 222) and placed in proximity to magnet 215. Shields 221 and 223 may include, for example, soft-magnetic materials. One or both sides of shields 221 and 223 may be abraded to improve, for example, an adhesion quality to layer 222 and/or an adhesion quality to layers 216 and/or 231.

Layer 222 may, for example, include a flexible adhesive, such as a room-temperature vulcanizing material (e.g., an RTV silicone). Layer 222 may, for example, cure when exposed to a change in one or more external conditions (e.g., atmospheric humidity). Once cured, layer 222 may form a bond between shields 221 and 223 that remains flexible. Accordingly, for example, layer 222 may allow shields 221 and 223 to be flexed, bent, or otherwise manipulated, while maintaining the bond between layers 221 and 223.

Shield 220 may, for example, be placed in proximity to and bonded with magnet 215 using a flexible adhesive layer, such as a pressure-sensitive adhesive layer (e.g., solvent-based acrylic layer 216) or other adhesive. Adhesive layer 216 may form a flexible bond between shield 220 and magnet 215, such that shield 220 maintains a substantially fixed relationship with relation to magnet 215 despite any flexing, bending, or any other form of manipulation that may occur with dynamic magnetic stripe communications device 200.

Shield 220 may be attached to electromagnetic generator 210 via magnet 215 and any intervening adhesion layers (e.g., layers 222 and 216) to form an electronic package that may be held together with other electronic packages via a mold while a liquid laminate material (e.g., a polyurethane-based or silicon-based substance) is provided (e.g., sprayed) into the mold. A protective layer, such as a tape layer (e.g., polyimide tape layer 230) may wrap around at least portions of shield 220, magnet 215, electromagnetic generator 210, PCB 202 and/or intervening adhesion layers to prevent liquid laminate from penetrating the individual layers of dynamic magnetic stripe communications device 200. The liquid laminate material may be cured (e.g., solidified) via a reaction caused by a change in condition (e.g., chemical, temperature, or UV light). The resulting interior laminate may be sandwiched between two layers of polymer to form a card having a laminate structure with top, middle, and bottom layers.

Layer 230 may include a protective layer, such as a tape layer (e.g., polyimide tape layer 232) and an adhesive layer, such as a flexible, pressure-sensitive adhesive layer (e.g., solvent-based acrylic layer 231). Accordingly, shield 220 may float between flexible adhesive layers 231 and 216 to allow shield 220 to remain in a substantially fixed relationship with respect to magnet 215 and electromagnetic generator 210 notwithstanding any flexing, bending or any other type of manipulation of dynamic magnetic stripe communications device 200.

Figure 3:
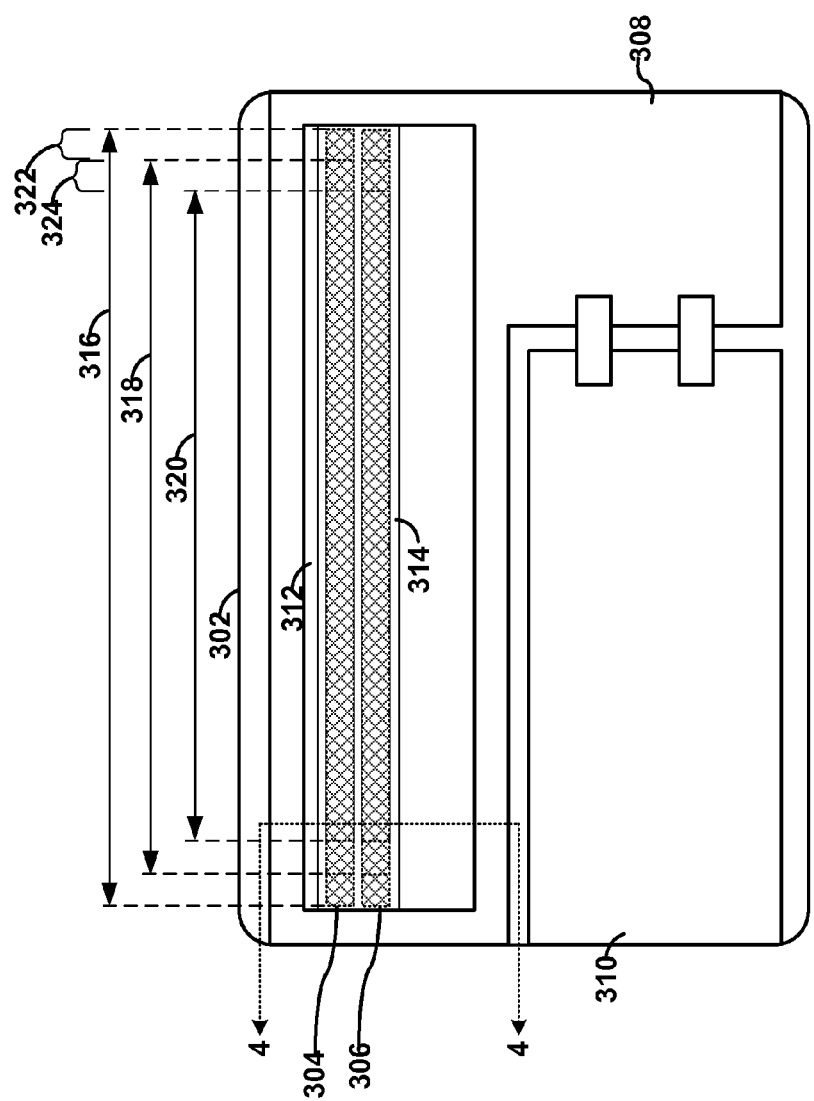
FIG. 3 is an illustration of a card constructed in accordance with the principles of the present invention.

FIG. 3 shows card 300. Card 300 may include one or more printed circuit boards (e.g., boards 308, 310, and 312). Boards 308, 310, and/or 312, may contain, for example, a processor, a battery, a display, a button, and any other component that may be provided on a card. Card 300 may include region 314 that may include a dynamic magnetic stripe communications device (not shown) and stepped materials (e.g., soft-magnetic materials 304 and 306) displaced within coils of the dynamic magnetic strip communications device (not shown). Stepped material 304 may, for example, be displaced within a coil of a dynamic magnetic stripe communications device (not shown) that may communicate a first track of magnetic stripe data to a read head of a magnetic stripe reader. Stepped material 306 may, for example, be displaced within a coil of a dynamic magnetic stripe communications device (not shown) that may communicate a second track of magnetic stripe data to a read head of a magnetic stripe reader.

Positioning of stepped material 304 within region 314 may be established, for example, by centering stepped material 304 about a centerline of a magnetic stripe data track (e.g., Track 1) position on card 300. Positioning of stepped material 306 within region 314 may be established, for example, by centering stepped material 306 about a centerline of a magnetic stripe data track (e.g., Track 2) position on card 300. Persons skilled in the art will appreciate that an additional stepped material may, for example, be positioned about a centerline of a magnetic stripe data track (e.g., Track 3) position on card 300 to establish three tracks of data communication capability from card 300.

Stepped materials 304 and 306 may include two or more layers (e.g., three layers) of material (e.g., soft magnetic material). A first layer of material of stepped materials 304 and/or 306 may have a length 316 that is between approximately 2.9 and 3.1 inches (e.g., approximately 2.984 inches). A second layer of material of stepped materials 304 and/or 306 may have a length 318 that is between approximately 2.8 and 2.9 inches (e.g., approximately 2.858 inches). A third layer of material of stepped materials 304 and/or 306 may have a length 320 that is between approximately 2.7 and 2.8 inches (e.g., approximately 2.734 inches).

Stepped materials 304 and 306 may include shorter layers stacked on top of longer layers so as to form a stepped structure on one or both ends of stepped materials 304 and 306. For example, a bottom layer of stepped materials 304 and 306 may extend beyond a length of a middle layer of stepped materials 304 and 306 by a length 322 that is between approximately 0.06 and 0.065 inches (e.g., approximately 0.0625 inches). Additionally, for example, the middle layer of stepped materials 304 and 306 may extend beyond a length of a top layer of stepped materials 304 and 306 by a length 324 that is between approximately 0.06 and 0.065 inches (e.g., approximately 0.0625 inches).

Card 300 may be laminated to form a card assembly, such that the laminate may cover a dynamic magnetic stripe communications device including stepped materials 304 and 306, PCBs 308-312 and any other components that may exist on PCBs 308-312. Prior to lamination, for example, a dynamic magnetic stripe communications device including stepped materials 304 and 306 may be built up onto PCB 312 via one or more production steps to yield an assembly that extends away from PCB 312 in a stacked fashion.

Figure 4:
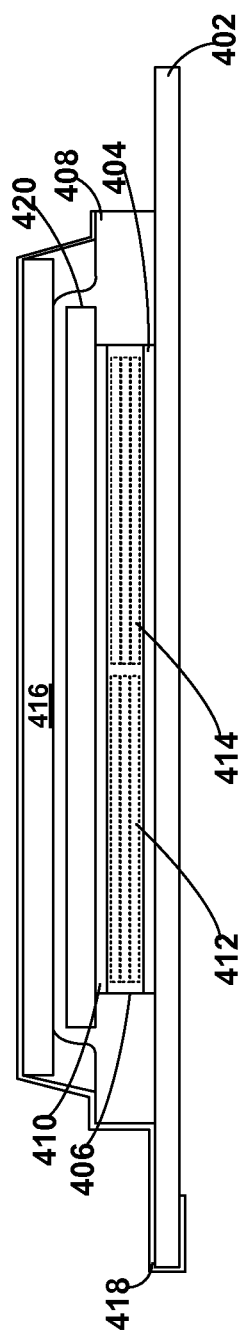
FIG. 4 is an illustration of a dynamic magnetic stripe communications device constructed in accordance with the principles of the present invention.

FIG. 4 shows a cross-section of dynamic magnetic stripe communications device 400. A strip of adhesive (e.g., cyanoacrylate 404) or other adhesive may be applied (e.g., manually or robotically) to PCB 402. Electromagnetic generator 406 may be placed onto PCB 402 along the strip of adhesive 404. Electromagnetic generator 406 may include a coil wrapped around a stepped material (e.g., soft-magnetic material 412) and may include another coil wrapped around a stepped material (e.g., soft-magnetic material 414).

PCB 402 may be placed into a press and PCB 402, adhesive layer 404, and electromagnetic generator 406 may be pressed together for a period of time (e.g., 30 seconds) thereby activating adhesive 404 to form a flexible bond between electromagnetic generator 406 and PCB 402. Once compressed, a stacked height of the combination of PCB 402, adhesive layer 404, and electromagnetic generator 406 may be between approximately 0.0095 and 0.0105 inches (e.g., approximately 0.010 inches).

A strip of adhesive (e.g., cyanoacrylate 410) or other adhesive may be applied (e.g., manually or robotically) to electromagnetic generator 406. Magnet 420 may be placed onto electromagnetic generator 406 along the strip of adhesive 410. The stack may be placed into a press and PCB 402, adhesive layer 404, electromagnetic generator 406, adhesive layer 410, and magnet 420 may be pressed together for a period of time (e.g., 30 seconds) thereby activating adhesive 410 to form a flexible bond between magnet 420 and electromagnetic generator 406. Once compressed, a stacked height of the combination of PCB 402, adhesive layer 404, electromagnetic generator 406, adhesive layer 410, and magnet 420 may be between approximately 0.0145 and 0.0175 inches (e.g., 0.016 inches).

An adhesive, such as a pressure-activated adhesive (e.g., solvent-based acrylic 408) may be applied to the stacked combination of PCB 402, adhesive layers 404 and 410, electromagnetic generator 406, and magnet 420. The stacked combination may then be pressed for a period of time (e.g., 30 seconds) to form a flexible bond between a top surface of magnet 420 and a bottom surface of adhesive layer 408. A top surface of adhesive layer 408 may be lined so as to avoid adhering adhesive layer 408 to the press. In addition, a die of the press may be shaped to conform to the shape of magnet 420. Accordingly, for example, adhesive layer 408 may be compressed to wrap around the edges of magnet 420 and along a length of each end of electromagnetic generator 406. Adhesive layer 408 may, for example, be non-conductive.

A liner (not shown) attached to adhesive layer 408 may be peeled away to expose a top surface of adhesive layer 408. Shield 416 may be placed onto the exposed adhesive layer 408. A protective layer, such as a protective tape layer (e.g., polyimide tape layer 418) may be placed onto shield 416 and wrapped around the stacked structure substantially as shown. Protective layer 418 may include a layer of adhesive, such as a pressure-activated adhesive (e.g., a solvent-based acrylic). Accordingly, for example, protective layer 418 may be pressed onto shield 416 to activate the adhesive layer. Shield 416 may, for example, float between the layer of adhesive of protective layer 418 and adhesive layer 408.

Accordingly, for example, shield 416 may be substantially free to move between top and bottom layers of adhesive during any bending, flexing, or manipulation of dynamic magnetic stripe communications device 400 while remaining substantially fixed in position relative to magnet 420 and electromagnetic generator 406. Once compressed, a stacked height of the combination of PCB 402, adhesive layer 404, electromagnetic generator 406, adhesive layer 410, magnet 420, adhesive layer 408, shield 416, and protective layer 418 may be between approximately 0.0165 and 0.0215 inches (e.g., approximately 0.019 inches).

Figure 5:
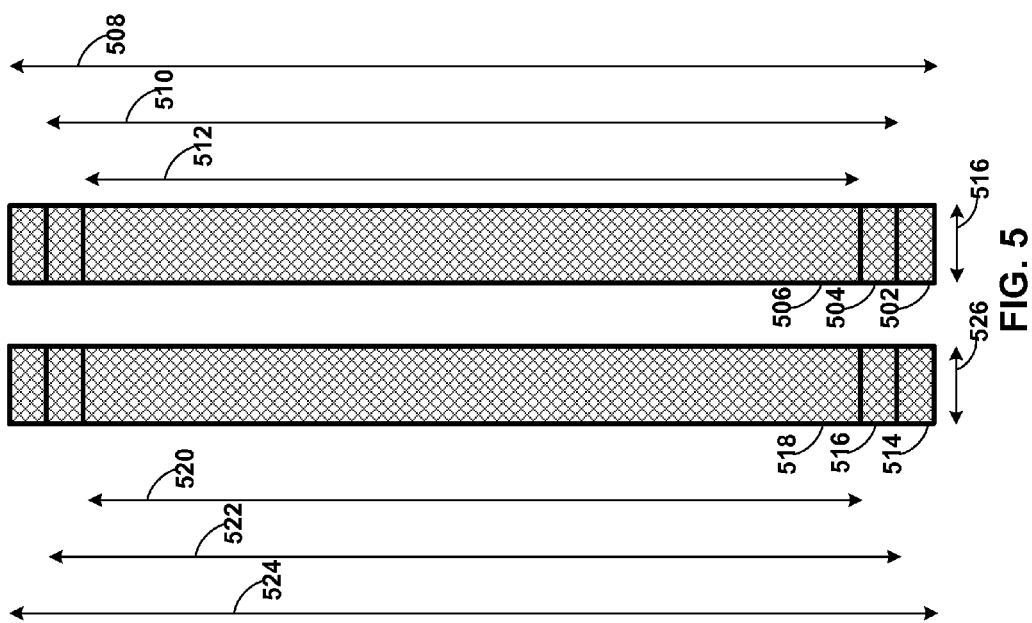
FIG. 5 is an illustration of interior portions of a dynamic magnetic stripe communications device constructed in accordance with the principles of the present invention.

FIG. 5 shows material portions that may exist within one or more coils of a dynamic magnetic stripe communications device. As per an example, a stepped material (e.g., soft-magnetic material layers 502, 504 and 506) may exist within a first coil of a dynamic magnetic stripe communications device to enhance communication of a first track of magnetic stripe information to a read head of a magnetic stripe reader from the dynamic magnetic stripe communications device. A length 508 of layer 502 may be longer than a length 510 of layer 504, which may in turn be longer than a length 512 of layer 506 to form a stepped structure having width 516 that may be between approximately 0.14 and 0.145 inches (e.g., 0.142 inches).

As per another example, a stepped material (e.g., soft-magnetic material layers 514, 516 and 518) may exist within a second coil of a dynamic magnetic stripe communications device to enhance communication of a second track of magnetic stripe information to a read head of a magnetic stripe reader from the dynamic magnetic stripe communications device. A length 524 of layer 514 may be longer than a length 522 of layer 516, which may in turn be longer than a length 520 of layer 518 to form a stepped structure having width 526 that may be between approximately 0.14 and 0.145 inches (e.g., 0.142 inches).

Figure 6:
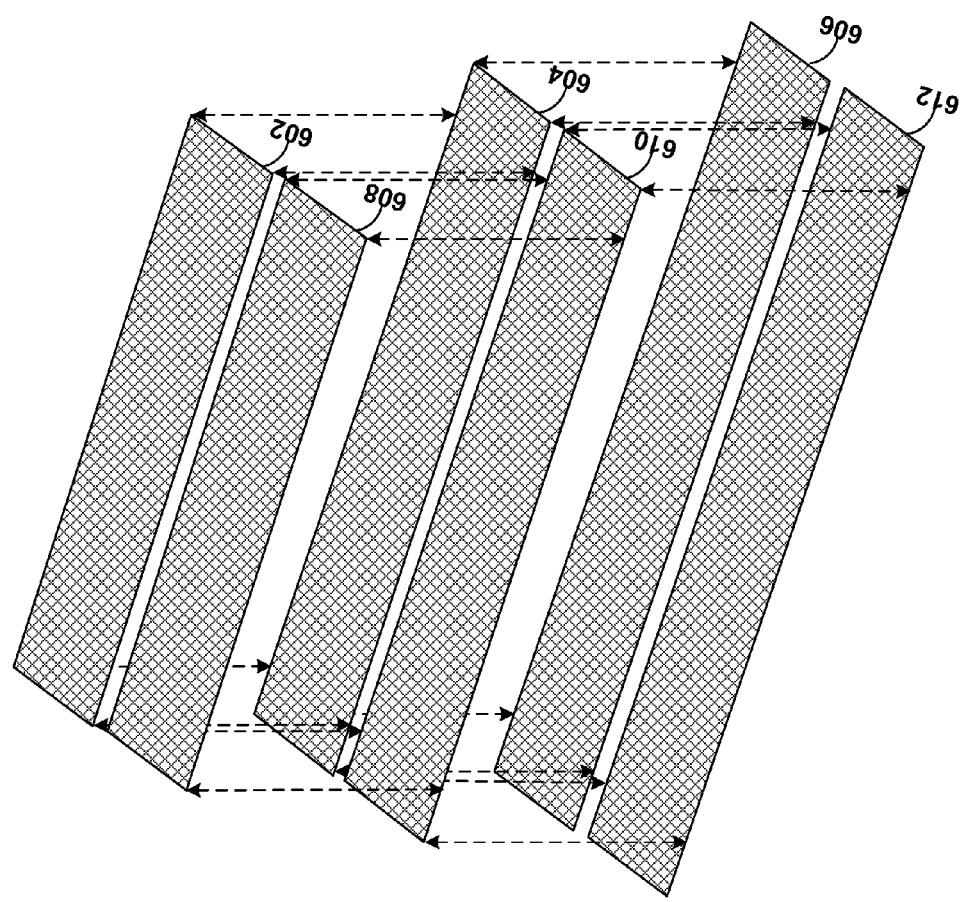
FIG. 6 is an illustration of stacked interior portions of a dynamic magnetic stripe communications device constructed in accordance with the principles of the present invention.

FIG. 6 shows a layered configuration that may include layered materials (e.g., soft-magnetic material stack 602-606 and soft-magnetic material stack 608-612). Three layers of material (e.g., soft-magnetic material stack 602-606) may, for example, be combined to form the stepped material contained within a first coil of a dynamic magnetic stripe communications device that may communicate a first track of magnetic stripe information to a read head of a magnetic stripe reader. Three layers of material (e.g., soft-magnetic material stack 608-612) may, for example, be combined to form the stepped material contained within a second coil of a dynamic magnetic stripe communications device that may communicate a second track of magnetic stripe information to a read head of a magnetic stripe reader. Persons skilled in the art will appreciate that any number of layers (e.g., 2 or more layers) of stepped material (e.g., soft-magnetic material) may be used to form stepped material included within one or more coils of a dynamic magnetic stripe communications device.

Layer 604 may be positioned to be approximately centered within a length of layer 606 while layer 602 may be positioned to be approximately centered within a length of layer 604. Accordingly, the stacked assembly may have stepped ends. Similarly, layer 610 may be positioned to be approximately centered within a length of layer 612 while layer 608 may be positioned to be approximately centered within a length of layer 610 to form a stacked assembly having stepped ends.

Figure 7:
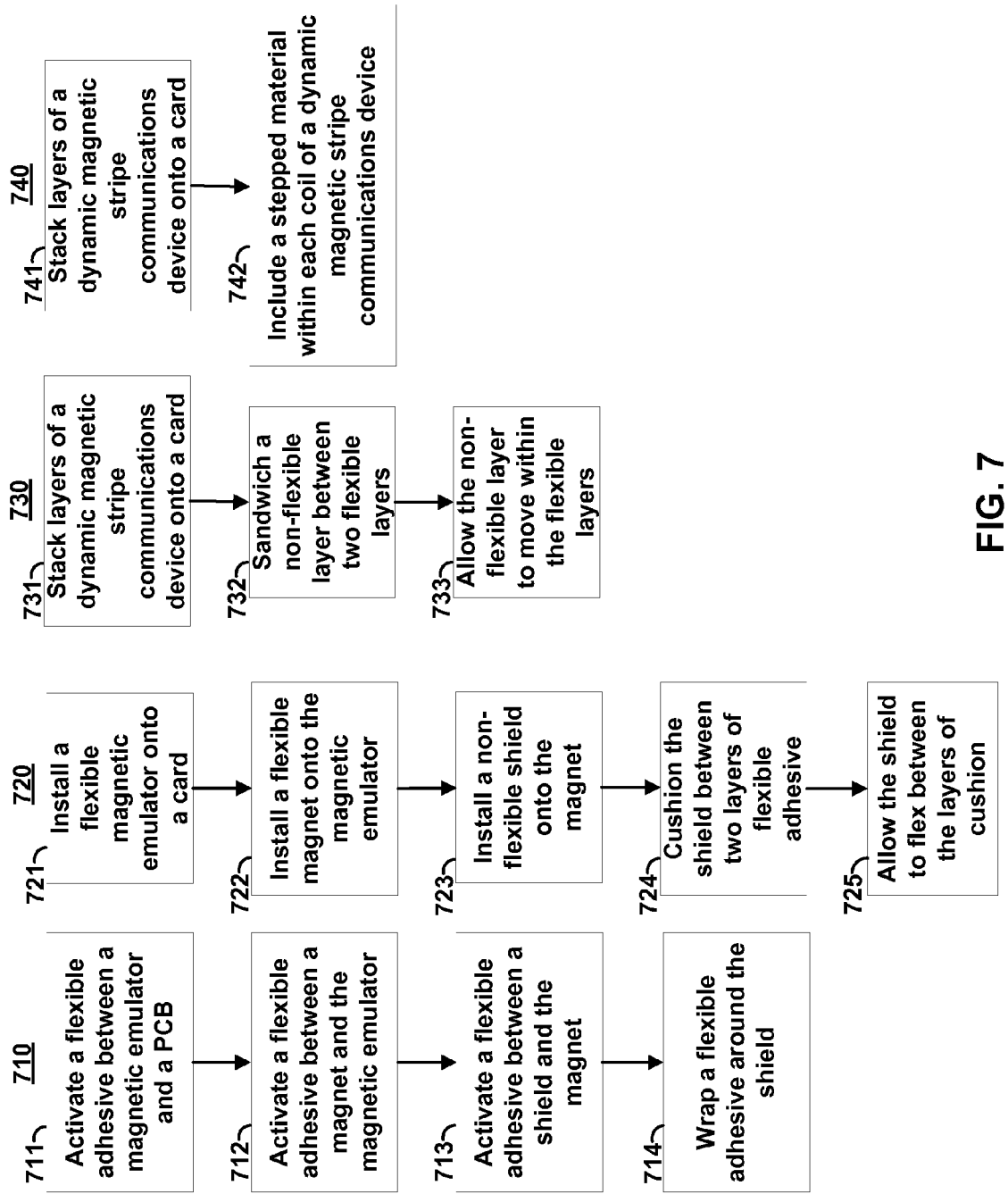
FIG. 7 is a flow chart of processes constructed in accordance with the principles of the present invention.

FIG. 7 shows flow charts 710 through 740. Sequence 710 may include, for example, applying an adhesive, such as a flexible adhesive, between an electromagnetic generator and a PCB and activating the flexible adhesive (e.g., as in step 711) by pressing the electromagnetic generator onto the PCB. In step 712, an adhesive, such as a flexible adhesive, may be applied between a magnet and the electromagnetic generator and activated by pressing the magnet onto the electromagnetic generator. In step 713, an adhesive, such as a pressure-sensitive adhesive (e.g., a solvent-based acrylic) may be applied between a shield and the magnet and activated by pressing the shield onto the magnet. In step 714, a protective layer containing a flexible adhesive, such as a pressure-sensitive adhesive (e.g., a solvent-based acrylic) may be wrapped around the shield to allow the shield to float between the flexible adhesive of the protective layer and the flexible adhesive layer between the shield and the magnet.

In step 721 of sequence 720, a flexible electromagnetic generator may be installed (e.g., glued) onto a flexible PCB of a flexible card using a flexible glue. In step 722, a flexible magnet may be installed (e.g., glued) onto the flexible electromagnetic generator using a flexible glue. In step 723, a substantially non-flexible shield may be installed (e.g., glued) onto the magnet using a flexible glue. In step 724, the shield may be adhered to and cushioned between two layers of flexible glue, such that when the shield is bent or flexed, the two layers of flexible glue may stretch, compress or otherwise conform to the flexed or bent shield (e.g., as in step 725). Accordingly, for example, the shield may remain laminated to the magnet while the card is being flexed, bent, or otherwise manipulated.

In step 731 of sequence 730, layers of a dynamic magnetic stripe communications device may be stacked onto a card. One of the layers may be non-flexible (e.g., a shield) and may be sandwiched between two flexible layers (e.g., two layers of flexible adhesive as in step 732). As the card is bent, flexed, or manipulated, the non-flexible layer may not stretch or compress, but the flexible layers that are adhered to the non-flexible layer may stretch or compress. Accordingly, for example, while the non-flexible layer is bent, flexed or otherwise manipulated, the non-flexible layer moves within the flexible layers (e.g., as in step 733) such that the flexible adhesive of the flexible layers adheres to the non-flexible layer and stretches and compresses to conform to the movement of the non-flexible layer.

In step 741 of sequence 740, layers of a dynamic magnetic stripe communications device may be stacked onto a card. One of the layers may include one or more coils of the dynamic magnetic stripe communications device. Each coil may include one or more layers of material (e.g., a soft-magnetic material) contained within each coil. Each layer of material within each coil of the dynamic magnetic stripe communications device may be shorter than the layer beneath it (e.g., as in step 742). For example, a length of a bottom layer of material may be made to be longer as compared to a length of a middle layer of material, while a length of the middle layer of material may be made to be longer as compared to a length of a top layer of material.

Persons skilled in the art will appreciate that the present invention is not limited to only the embodiments described. Instead, the present invention more generally involves dynamic information. Persons skilled in the art will also appreciate that the apparatus of the present invention may be implemented in ways other than those described herein. All such modifications are within the scope of the present invention, which is limited only by the claims that follow.

What is claimed is:

1. A card comprising:
    a dynamic magnetic stripe communications device having multiple layers, said multiple layers including,
    an electromagnetic generator including
        a coil, and
        a stepped structure within said coil,
    wherein said stepped structure includes a first layer and a second layer, and
    a length of said first layer of said stepped structure is longer than a length of said second layer of said stepped structure.

2. The card of claim 1, wherein said second layer is stacked above said first layer.

3. The card of claim 1, wherein said first layer includes a magnetic material.

4. The card of claim 1, wherein said first layer includes a soft-magnetic material.

5. The card of claim 1, wherein said second layer is on said first layer, and
    said second layer includes a magnetic material.

6. The card of claim 1, wherein said second layer is on said first layer, and
    said second layer includes a soft-magnetic material.

7. The card of claim 1, wherein said second layer is on said first layer,
    said first layer includes a soft-magnetic material, and
    said second layer includes a soft-magnetic material.

8. The card of claim 1, wherein said stepped structure includes a third layer.

9. The card of claim 1, wherein said stepped structure includes a third layer, and
    a length of said second layer of said stepped structure is longer than a length of said third layer of said stepped structure.

10. The card of claim 1, wherein said stepped structure includes a third layer,
    a length of said second layer of said stepped structure is longer than a length of said third layer of said stepped structure,
    said second layer is stacked on said first layer, and
    said third layer is stacked on said second layer.

11. The card of claim 1, wherein said stepped structure includes a third layer and a fourth layer.

12. The card of claim 1, wherein said stepped structure includes a third layer and a fourth layer, and
    a length of said second layer of said stepped structure is longer than a length of said third layer of said stepped structure, and a length of said third layer of said stepped structure is longer than a length of said fourth layer of said stepped structure.

13. The card of claim 1, wherein said dynamic magnetic stripe communications device includes a magnetic material outside of said coil.

14. The card of claim 1, wherein said dynamic magnetic stripe communications device includes a hard-magnetic material outside of said coil.

15. The card of claim 1, wherein said dynamic magnetic stripe communications device includes a hard-magnetic material outside of said coil,
    said coil is operable to generate an electromagnetic field, and
    said hard-magnetic material is positioned to subject said electromagnetic field to a torque induced by a magnetic field of said hard-magnetic material.

16. The card of claim 1, wherein said dynamic magnetic stripe communications device includes a hard-magnetic material outside of said coil and a shield outside of said coil.

17. The card of claim 1, wherein said dynamic magnetic stripe communications device includes a hard-magnetic material outside of said coil and multiple strips of shielding material outside of said coil, said multiple strips reducing a magnetic bias from said magnetic material.

18. The card of claim 1, wherein said dynamic magnetic stripe communications device includes a hard-magnetic material outside of said coil and a shielding material outside of said coil, said shielding material reducing a magnetic bias from said magnetic material and reducing an electromagnetic field generated by said electromagnetic generator.

* * * * *